Figure 1:
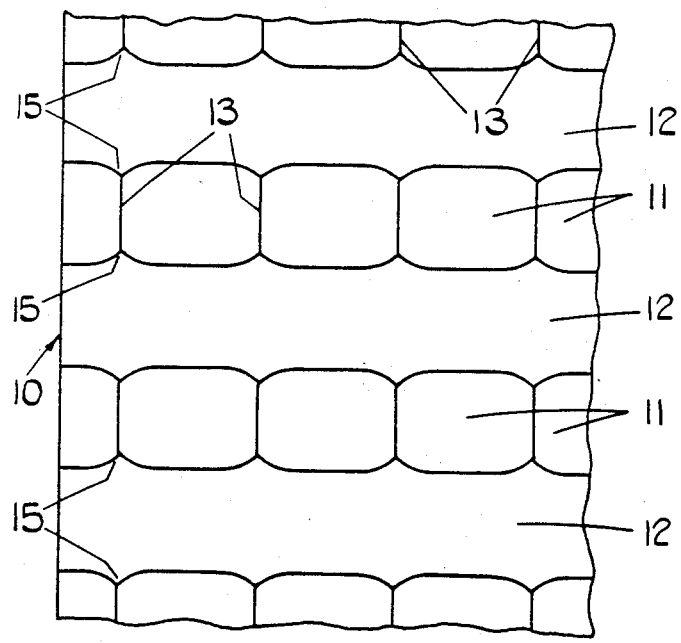

United States Patent [19]

Green

[11] 4,332,438

[45] Jun. 1, 1982

[54] LENS ELEMENT

[75] Inventor: Stanley Green, Warley, England

[73] Assignee: Lucas Industries Limited, Birmingham, England

[21] Appl. No.: 128,226

[22] Filed: Mar. 7, 1980

[30] Foreign Application Priority Data

Mar. 23, 1979 [GB] United Kingdom ................. 7910325

[51] Int. Cl.³ ............................ G02B 3/08; F21V 5/04
[52] U.S. Cl. .................................... 350/167; 362/338; 362/360; 362/361
[58] Field of Search ............... 350/128, 167, 431, 433; 362/338, 360, 361

[56] References Cited

U.S. PATENT DOCUMENTS

| 1,887,872 | 11/1932 | Ernst | 350/167 |
| 3,222,516 | 12/1965 | Miles | 362/338 |

FOREIGN PATENT DOCUMENTS

| 2022442 | 9/1970 | Fed. Rep. of Germany . | |
| 1755770 | 3/1971 | Fed. Rep. of Germany . | |
| 2227956 | 1/1974 | Fed. Rep. of Germany | 350/167 |
| 2453234 | 4/1976 | Fed. Rep. of Germany . | |
| 1055225 | 10/1953 | France . | |
| 2291062 | 6/1976 | France . | |
| 96905 | 4/1973 | German Democratic Rep. . | |
| 1387589 | 3/1975 | United Kingdom . | |

Primary Examiner—John K. Corbin
Assistant Examiner—Bruce Y. Arnold
Attorney, Agent, or Firm—Ladas & Parry

[57] ABSTRACT

A lens element for a vehicle lamp, e.g. a direction indicator lamp, consists of a molded transparent plastic body provided with parallel rows of projections each of which has the form of part of a body of revolution of a cylindrical mid-region and end regions which each have the form of part of the body of revolution of the mid-region.

In order to produce the required light output in the direction of the longitudinal axis of the vehicle in the case where the lens element is used in a lamp assembly having a relatively inefficient reflector, the lens element is provided with a plurality of ribs which extend parallel to the rows of projections and which are longer than the projections. The ribs preferably alternate with the rows of projections and may extend for the whole or only part of the length of the lens element.

7 Claims, 5 Drawing Figures

LENS ELEMENT

This invention relates to a lens element and is mainly concerned with a lens element used in a vehicle lamp, for example a direction indicator lamp.

It is known to provide a lens element in the form of a moulded body having, on one face thereof, a plurality of parallel rows of projections with the projections of each row being aligned with one another and each projection being part-spherical in shape. Such a lens element provides an effective horizontal and vertical distribution or spread of light intensity from a source placed behind the lens element. In some cases, this distribution of light intensity can be such that, in the case of direction indicator lights, the required minimum light output in the direction of the longitudinal axis of the vehicle is not sufficient. In order to transmit a greater proportion of light in such a direction, it has been proposed in British Pat. No. 1,387,589 to provide a lens element in the form of a moulded body having, on one face thereof, a plurality of parallel rows of projections, the projections of each row being aligned with one another and each projection having a right cylindrical mid-region and end region which each have the form of part of the body of revolution of the transverse cross-section of the mid-region. In a preferred embodiment as described in British Pat. No. 1,387,589, the projections when viewed in plan appear to have a rectangular periphery, each peripheral side of each projection being common to an adjacent projection with the exception of the peripheral sides of the projections of the boundaries of the lens. It is preferable in such an arrangement for the ratio of the length to the sides of the apparent rectangular peripheries of the projections to be 2 to 1.

A lens element of the last-described type can produce the required light output and distribution when used with a conventional type of reflector which is relatively large, i.e. it has a relatively large collecting area, and which has a surface which reflects light efficiently. Typically, a reflective surface formed by a vacuum deposited aluminium layer is employed.

However, there is now a trend towards the production of lamps having rather small reflectors both for cost and styling reasons. Additionally, for cost reasons, there is a requirement to provide a rather less expensive form of reflective coating, for example, a reflective coating formed by a painted aluminium surface. It is not possible consistently to obtain the required light distribution and output with a reflector of this type using a lens element of the type disclosed in British Pat. No. 1,387,589 for a given power of light bulb.

It is an object of the present invention to obviate or mitigate the above drawback.

According to the present invention, there is provided a lens element in the form of a moulded body having, on one face thereof, a plurality of parallel rows of projections, and a plurality of ribs parallel to the rows of projections, each of the projections having the form of part of a body of revolution or having a cylindrical mid-region and end regions which each have the form of part of the body of revolution of the mid-region, the length of each rib being greater than the corresponding dimension of each projection, and at least one of the ribs being disposed between at least one pair of adjacent rows of the projections.

As a result of the provision of the ribs, the quantity of light emanating from the lens element in the direction of the longitudinal axis of the vehicle body is increased so that the lens element can be used with a less efficient type of reflector and still produce the required output of light in the above-mentioned direction, i.e. at zero horizontal spread.

Each rib may have a different cross-sectional shape to the other rib or ribs and/or to the projections.

Each rib may extend over substantially the whole length of the lens element or it may only extend over part of the length of the lens element.

Preferably, the ribs alternate with the rows of projections.

In a preferred arrangement, the projections have right cylindrical mid-regions of part circular cross-section and the ribs are of part-circular cross-section. Advantageously, the radius of curvature of each rib is greater than that of each projection.

The projections in each row may be identical or different depending upon the intended characteristics of the lens element. Additionally, the projections in one row may be identical with or different from the projections in another row.

The ribs may be less high than the projections, i.e. they may project away from the main body of the lens element by an amount which is less than that of the projections.

At least one of the projections and/or ribs may define a lens integral with and overlying a prism. Examples of such a construction of projection are disclosed in British Pat. No. 1,546,805, the disclosure of which is incorporated herein by reference.

Figure 2:
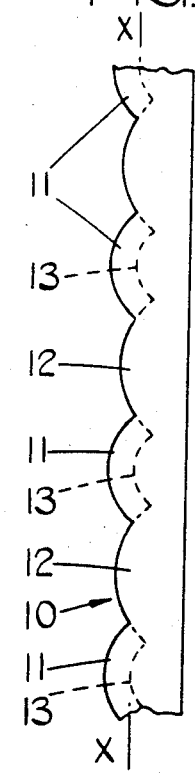
Figure 3:
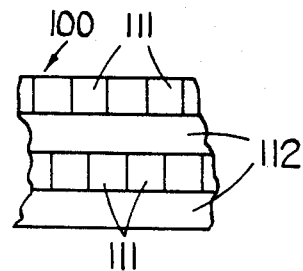
Figure 4:
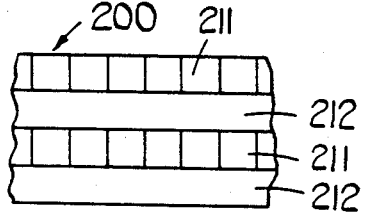
Figure 5:
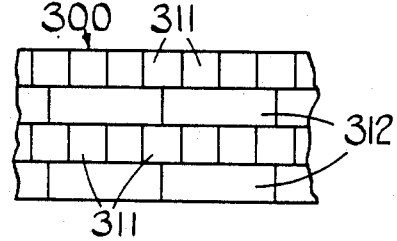

Embodiments of the present invention will now be described, by way of example, with reference to the accompanying drawing, in which:

FIG. 1 is a plan view of part of a lens element according to one embodiment of the present invention, FIG. 2 is an end view of the lens element shown in FIG. 1, FIG. 3 is a schematic view of part of a second embodiment of lens element according to the present invention, FIG. 4 is a schematic view of a third embodiment of lens element according to the present invention, and FIG. 5 is a schematic view of a fourth embodiment of lens element according to the present invention.

Referring now to FIGS. 1 and 2 of the drawing, the lens element illustrated therein comprises a moulded body 10 formed of a transparent, synthetic plastics material such as a polycarbonate resin which has an amber colour so as to be suitable for use as a lens element for a direction indicator lamp on a road vehicle. The moulded body 10 has on a surface thereof which faces inwardly of the lamp in use, a plurality of rows of integral projections 11 alternating with a plurality of rows of integral ribs 12, all of the rows being mutually parallel and extending horizontally when the lens element is installed on a motor vehicle.

In this embodiment, all of the projections 11 are identical and all of the ribs 12 are identical.

Each projection 11 has a right-circular cylindrical mid-region whose radius is 3.96 mm and each projection 11 has end regions which are each part-spherical in form and have a radius of 3.96 mm. centered on the central axis of the cylindrical mid-region. Thus, each end-region is part of the body of revolution of the transverse cross-section of the mid-region being formed by rotating the transverse cross-section of the mid-region about an axis which intersects the central axis of the mid-region at right angles. Each row of projections 11 in the lens element 10 is preferably moulded from a row of recesses which have been formed in a mould in the manner described and claimed in British Pat. No. 1,387,589. As can be seen from FIG. 1, adjoining ends of the projections 11 extend at right-angles to the direction of extent of the rows of projections 11. However, such ends 13 are radiussed in a direction perpendicular to the general plane of the body 10 as will be apparent from FIG. 2 where the ends 13 are shown in dotted line. In this embodiment, the ratio of the length of each projection 11 to its width is 2 to 1 and the length of the right-circular cylindrical mid-region thereof is 1.57 mm. In this embodiment, the total length of each projection is 4.75 mm. In another embodiment, the mid-region of each projection has a length of 0.79 mm whilst the total length of each projection 11 remains the same at 4.75 mm.

Each rib 12 extends for the complete length of the lens element 10 and has a part-circular cylindrical cross-section of 4.75 mm radius. The width of each rib 12 between the cylindrical mid-regions of the projections 11 on opposite sides of the rib 12 is 2.4 mm. As can be seen from FIG. 2, each rib 12 projects away from the main body of the lens element by an amount which is less than that of each projection 1. In this embodiment, the top of each rib 12 is 0.15 mm from a plane X—X (see FIG. 2) in which lie the junctions between the mid-regions of the projections 11 and the respective ribs 12 whilst the top of each projection 11 is 0.18 mm from the same plane X—X. It is to be appreciated that the shape of each rib 12 continues into recesses 15 or incursions defined between adjacent projections 11 in each row.

With the above form of construction, rather more light passes through the lens element in a direction of the longitudinal axis of the vehicle than would be the case if the ribs 12 were absent and adjacent rows of projections 11 were contiguous as described in British Pat. No. 1,387,589. This is because the proportion of end regions of the projections to the total area of the lens element has been reduced and because the ribs 12 have a greater radius of curvature than the projections 11 so that there is a reduction in the amount of light which is spread.

In the above-described embodiment, the projections 11 in each row are aligned with the projections 11 in the other rows.

Referring now to FIG. 3 lens element 100 illustrated very schematically therein is the same as the lens element described with reference to FIGS. 1 and 2, projections 111 and ribs 112 being the same as the projections 11 and 12 with the exception that the projections 111 in each row are staggered relative to the projections 111 in an adjacent row of projections 111. Recesses similar to recesses 15 will be provided in the embodiment of FIG. 3 although such recesses are not shown because FIG. 3 is only schematic. Of course, the recesses on one longitudinal side of each rib 112 will be staggered relative to the recesses on the opposite longitudinal side thereof instead of being aligned as in the case of the recesses 15 of the embodiment of FIGS. 1 and 2.

Referring now to FIG. 4, lens element 200 illustrated schematically therein has projections 211 which have no cylindrical mid-region. Instead, these projections 211 are of part-spherical shape having, in this embodiment, a radius of 3.96 mm. Ribs 212 are of part-circular cross-section and, as will be apparent from FIG. 4, are of different radii so that adjacent ribs 212 are of different width. However, the radius of each rib is greater than that of each projection 211 and the height of each rib 212 is less than that of each projection 211.

Referring now to FIG. 5, lens element 300 illustrated therein has projections 311 and ribs 312 which are identical with the projections 11 and ribs 12, respectively, of the embodiment of FIG. 1 with the exception that each rib 12 does not extend over the full length of the lens element 300 but extends for, for example, the length of about 3 projections 311. The ends of each rib 312 are part-spherical with a radius equal to that of the part-circular section mid-region of each rib 312. Thus, in effect, each rib 312 is of similar formation to the projections 311 in that it has a right-circular cylindrical mid-region and part-spherical end regions.

In each of the embodiments of FIGS. 3 to 5, the light transmission at zero scatter through the lens element is greater than in the case where the lens element was provided solely with adjoining rows of projections without the provision of the ribs.

In the above described embodiments each of the lens elements is used in a lamp assembly in which the axis of the lamp reflector extends horizontally and parallel to the longitudinal axis of the vehicle i.e. with the lens element vertical and at right angles to the longitudinal axis of the vehicle. However, for vehicle styling or constructional reasons, it may be necessary for the reflector to be mounted with its axis horizontal but inclined to the longitudinal axis of the body at an acute angle. Under these circumstances, in order to obtain the required light output, it will be necessary to provide each projection 11 in the form of a lens integral with and overlying a prism so that the prism serves to refract light which has passed through the lens in the required direction, i.e. parallel to the longitudinal axis of the vehicle. Examples of such a construction of projections are disclosed in British Pat. No. 1,546,805. In the case where the ribs do not extend over the complete length of the lens element (see for example FIG. 5), it is possible to arrange for at least one of the ribs to define a lens integral with and overlying a prism as an alternative to or in addition to at least one of the projections being so formed.

In addition to enabling the required light output to be obtained using a relatively inefficient lamp reflector, the above described lens elements have the added advantage that a very large number of projection and rib patterns are possible with the result that a greater flexibility of design is possible.

I claim:

1. A lens element in the form of a moulded body, a plurality of parallel rows of projections on one face of said moulded body and a plurality of ribs on said one face of said body, said ribs being parallel to said parallel rows of projections, each of said projections having the form of part of a body of revolution or having a cylindrical mid-region and end regions which each have the form of part of the body of revolution of a transverse section of the mid-region, the length of each said rib being greater than the corresponding dimension of each said projection, and at least one of said ribs being disposed between at least one pair of adjacent rows of said projections.

2. The lens element of claim 1, wherein each said rib extends over substantially the whole length of the lens element.

3. The lens element of claim 1 wherein each said rib extends over only part of the length of the lens element.

4. The lens element of claim 1, wherein said ribs alternate with said rows of projections.

5. The lens element of claim 1 or 4, wherein said projections have right cylindrical mid-regions of part circular cross-section and said ribs are of part-circular cross-section.

6. The lens element of claim 5 wherein the radius of curvature of each said rib is greater than that of each said projection.

7. The lens element of claim 1, wherein said ribs are less high than said projections.

* * * * *